United States Patent
Ishiguro

(10) Patent No.: US 7,561,796 B2
(45) Date of Patent: Jul. 14, 2009

(54) OPTICAL SENDING APPARATUS, OPTICAL RECEIVING APPARATUS, AND OPTICAL TRANSMISSION SYSTEM FOR SUPERVISING FAULT INFORMATION AND METHODS THEREOF

(75) Inventor: Makoto Ishiguro, Tokyo (JP)

(73) Assignee: NEC Corporation (JP)

( * ) Notice: Subject to any disclaimer, the term of this patent is extended or adjusted under 35 U.S.C. 154(b) by 482 days.

(21) Appl. No.: 11/477,629

(22) Filed: Jun. 30, 2006

(65) Prior Publication Data
US 2007/0004073 A1    Jan. 4, 2007

(30) Foreign Application Priority Data
Jul. 1, 2005    (JP) .............................. 2005-194447

(51) Int. Cl.
*H04B 10/08*    (2006.01)
(52) U.S. Cl. .......................... 398/23; 398/182; 398/183; 398/192; 398/33; 398/177
(58) Field of Classification Search ................. 398/173, 398/141, 175, 177, 181, 135, 5, 6, 11, 10, 398/13, 15, 17, 18, 20, 22, 23, 24, 30, 31, 398/37, 38, 158, 159, 164, 25, 79, 33, 182, 398/183, 192, 193, 194, 136, 139, 202, 208
See application file for complete search history.

(56) References Cited
U.S. PATENT DOCUMENTS

| | | | | |
|---|---|---|---|---|
| 6,356,367 B1 * | 3/2002 | DeCusatis et al. | ............... | 398/5 |
| 6,504,630 B1 * | 1/2003 | Czarnocha et al. | ............ | 398/15 |
| 2002/0118413 A1 | 8/2002 | Yamada et al. | | |
| 2003/0067648 A1 | 4/2003 | Antosik et al. | | |

FOREIGN PATENT DOCUMENTS
JP    6-21960    1/1994

* cited by examiner

*Primary Examiner*—Hanh Phan
(74) *Attorney, Agent, or Firm*—Dickstein, Shapiro, LLP.

(57) ABSTRACT

An optical transmission system for transmitting optical signals in which signals at different bit rates coexist, includes an optical sending apparatus for, when one or more faults are detected in a signal for transmission, generating a fault information signal with one frequency set in advance in accordance with the faults, converting the fault information signal into an optical signal, and sending out the optical signal, an optical transmission line for transmitting the optical signal sent out from the optical sending apparatus, and an optical receiving apparatus for receiving the optical signal transmitted through the optical transmission line, converting the received optical signal into an electric signal, detecting the fault information signal from the electric signal, and halting output of the electric signal to the outside.

2 Claims, 9 Drawing Sheets

| No. | FAULT INFORMATION | CORRESPONDING FREQUENCY |
|---|---|---|
| 1 | LOS | f0 |
| 2 | EXTRAORDINARY FREQUENCY | f1 |
| 3 | LOF | f2 |
| 4 | EXTRAORDINARY FREQUENCY + LOF | f3 |

FIG.3

| No. | APPLICATION | DATA RATE (Mbps) |
|---|---|---|
| 1 | FDDI | 125.00 |
| 2 | OC-3, STM-1 | 155.52 |
| 3 | ESCON, SBCON | 200.00 |
| 4 | DVB-ASI | 270.00 |
| 5 | OC-12, STM-4 | 622.08 |
| 6 | FIBER CHANNEL, FICON | 1062.50 |
| 7 | GbE | 1250.00 |
| 8 | HDTV | 1485.00 |
| 9 | 2G FIBER CHANNEL | 2125.00 |
| 10 | OC-48, STM-16 | 2488.32 |

FIG.9

OPTICAL SENDING APPARATUS, OPTICAL RECEIVING APPARATUS, AND OPTICAL TRANSMISSION SYSTEM FOR SUPERVISING FAULT INFORMATION AND METHODS THEREOF

BACKGROUND OF THE INVENTION

1. Field of the Invention

The present invention relates to an optical sending apparatus, an optical receiving apparatus, and an optical transmission system for supervising fault information and methods thereof. In particular, the present invention relates to an optical sending apparatus, an optical receiving apparatus, and an optical transmission system for supervising fault information at the time of sending, transmitting, and receiving of optical signals, respectively, in which signals at different bit rates coexist, and methods thereof.

2. Description of the Related Art

As the result of recent popularization of the Internet and the like, the amount of information that needs to be transmitted is increasing substantially. Against this backdrop, a wavelength-division-multiplexing transmission system is used. In the wavelength-division-multiplexing transmission system, multiple pieces of data are superimposed on optical signals having different wavelengths and the optical signals are multiplexed. Then, wavelength-multiplexed optical signals are transmitted through one optical fiber cable. As a result, it becomes possible to dramatically increase the amount of information transmitted with one optical fiber cable.

FIGS. 7 and 8 show a construction of an optical transmission system that performs the wavelength-division-multiplexing transmission described above.

An optical transmission system 1 shown in FIG. 7 includes an optical sending apparatus 2, an optical fiber 3, and an optical receiving apparatus 4. The optical sending apparatus 2 converts a first optical signal pa at a predetermined bit rate transmitted from a transmitter 5, which is an upstream apparatus, into a second optical signal pb having a required wavelength and optical output for long-haul optical communication. Then, the optical sending apparatus 2 sends out the second optical signal pb to the optical fiber 3 that is an optical transmission line. The optical fiber 3 transmits the optical signal pb. The optical receiving apparatus 4 receives the second optical signal pb passed through the optical fiber 3. Then, the optical receiving apparatus 4 converts the second optical signal pb into a third optical signal pc having a wavelength and optical output conforming to the standards of a receiver 6 that is a downstream apparatus. Finally, the optical receiving apparatus 4 outputs the third optical signal pc to the receiver 6. In this manner, communication between the transmitter 5 and the receiver 6 that are spaced apart from each other by along distance is made possible by the optical transmission system 1.

FIG. 8 is a block diagram showing a construction of the optical sending apparatus 2 in FIG. 7.

The optical sending apparatus 2 includes an optic-electric conversion circuit (O/E) 11, a clock and data signals regenerating circuit 12, branching circuits 13 and 14, an electric-optic converting circuit (E/o) 15, and a signal frame monitoring circuit 16. The optic-electric conversion circuit 11 converts the first optical signal pa inputted from the transmitter 5 into an electric signal ea. The clock and data signals regenerating circuit 12 regenerates a clock signal eb and a data signal ec from the inputted electric signal ea. The branching circuit 13 branches the clock signal eb into a signal for the electric-optic converting circuit 15 and a signal for the signal frame monitoring circuit 16. In a like manner, the branching circuit 14 branches the data signal ec into a signal for the electric-optic converting circuit 15 and a signal for the signal frame monitoring circuit 16. The electric-optic converting circuit 15 multiplexes the inputted clock signal eb and the data signal ec and then converts the multiplexed signals into a second optical signal pb.

In addition, the optic-electric conversion circuit 11 monitors signal disappearance (LOS: Loss of Signal) in the first optical signal pa. The signal frame monitoring circuit 16 monitors an out-of-synch state of frames (LOF: Loss of Frame) with reference to the inputted clock signal eb and the data signal ec.

It should be noted here that the transmitter 5 and the receiver 6 in FIG. 7 are pursuant to the standards of Synchronous Optical Network/Synchronous Digital Hierarchy (SONET/SDH), such as the specifications of STM-1 (bit rate: 155.52 Mbps) Also, there is a case where in place of the transmitter 5 and the receiver 6, for instance, a transmitter 5B and a receiver 6B pursuant to the standards of Gigabit Ethernet (GbE (registered trademark)) or a transmitter 5C and a receiver 6C pursuant to the fiber channel standards are used as shown in FIG. 7.

FIG. 9 shows examples of signal bit rates (Mbps) under the standards of applications. These signal bit rates are different from each other, so the optical sending apparatus 2 and the optical receiving apparatus 4 in FIG. 7 adopt specifications corresponding to the respective bit rates.

In the optical transmission system 1 described above, however, there arises the following problem.

In the optical transmission system 1, the bit rate of the first optical signal pa sent out from the transmitter 5 is determined to one kind. Therefore, when a signal at a different bit rate has been inputted from the transmitter 5, the signal frame monitoring circuit 16 detects the signal as an incorrect signal and halts sending out the second optical signal pb to the optical fiber 3. That is, there is a problem that the optical transmission system 1 is only capable of handling signals at a specific bit rate and is incapable of handling signals at different bit rates.

In view of this problem, an optical transmission system is also manufactured which is made capable of coping with transmission of signals at all bit rates by removing the function of the signal frame monitoring circuit 16. When the bit rate monitoring function is removed in this manner, however, even when a fault has occurred in the first optical signal pa from the upstream apparatus, it becomes impossible to detect the fault. Therefore, in this case, there arises a problem that signals containing faults are outputted to the downstream apparatus.

As a related technique other than the optical transmission systems described above, there is an optical relaying apparatus described in Related Art Document 1 "Japanese Patent Laid-Open No. 06-021960A, particularly see page 2 and FIG. 1", for instance. The optical relaying apparatus converts an electric signal from a metal cable into an optical signal for an optical fiber transmission line and relays the optical signal. In addition, the optical relaying apparatus converts an optical signal from the optical fiber transmission line into an electric signal for the metal cable and relays the electric signal. The optical relaying apparatus is constructed so that bidirectional transmission is performed in this manner. Also, the optical relaying apparatus includes a signal-state detecting unit, a low-frequency signal generating unit, a switch, a frequency monitoring unit, and a test-data generating unit. The signal-state detecting unit detects whether a current state is a non-signal state. The low-frequency signal generating unit generates a specific signal that will not appear at the time of information transmission. The switch switches an input signal into an optical sending unit from a data signal to a specific signal. The frequency monitoring unit detects whether a received optical signal is the specific signal. The test-data generating unit sends out a test signal in accordance with output from the frequency monitoring unit. With the construction elements, when a fault has occurred in the optical fiber and the non-signal state has been detected at the signal-state detecting unit, the specific signal that will not appear at the time of information transmission is generated from the low-frequency signal generating unit. Then, when the specific signal has been detected at the frequency monitoring unit, the test signal is generated from the test-data generating unit. Next, the test signal is sent out to the optical fiber, to which the fault has occurred, by switching with the switch.

In the case of the optical relaying apparatus described in the Related Art Document 1, however, there is a problem that only faults concerning the non-signal state are monitored and it is impossible to perform monitoring of other faults.

In addition, in the optical transmission systems and the optical relaying apparatus, no method is proposed with which, when multiple kinds of faults have occurred, the faults are identified with ease.

SUMMARY OF THE INVENTION

In view of the foregoing and other exemplary problems, drawbacks, and disadvantages of the related art methods and structures, exemplary feature of the present invention is to provide an optical sending apparatus, an optical receiving apparatus, and an optical transmission system for supervising multiple kinds of fault information in optical signals, in which signals at different bit rates coexist, with a simple construction and methods thereof.

More specifically, an optical sending apparatus is provided which, when one kind of fault has occurred or when multiple kinds of faults have occurred at the same time, generates a fault information optical signal a tone frequency set in advance for the at least one kind of fault and transmits the fault information optical signal. Also, an optical receiving apparatus is provided which, when having received the fault information optical signal, halts sending out of the fault information optical signal to a downstream apparatus. Further, an optical transmission system including the apparatuses and fault information sending, receiving, and transmitting methods concerning them are provided.

An optical sending apparatus according to the present invention for sending out optical signals in which signals at different bit rates coexist, includes (1) a frequency generating unit for, when one or more faults occurring in a signal for transmission are detected, generating a fault information signal with one frequency set in advance in accordance with the one or more faults, (2) a switching unit for passing the fault information signal instead of the signal for transmission, and (3) an electric-optic converting unit for converting the passed fault information signal into an optical signal.

An optical receiving apparatus according to the present invention for receiving optical signals in which signals at different bit rates coexist, includes (1) an optic-electric conversion unit for converting the received optical signal into an electric signal, (2) a frequency detecting unit for detecting a frequency of the electric signal, and (3) an optical output controlling unit for, when a fault information signal with one frequency set in advance in accordance with one or more faults is detected, halting output of the electric signal to the outside.

An optical transmission system according to the present invention for transmitting optical signals in which signals at different bit rates coexist, includes (1) the optical sending apparatus mentioned above for, when the one or more faults are detected in the signal for transmission, generating the fault information signal, converting the fault information signal into the optical signal, and sending out the optical signal, (2) an optical transmission line for transmitting the optical signal sent out from the optical sending apparatus, and (3) the optical receiving apparatus mentioned above for receiving the optical signal transmitted through the optical transmission line and detecting the fault information signal.

A fault information sending method according to the present invention used for sending out optical signals in which signals at different bit rates coexist, includes (1) detecting one or more faults occurring in a signal for transmission, (2) halting sending out the signal for transmission as an optical signal when the one or more faults are detected, and (3) sending out a fault information signal with one frequency set in advance in accordance with the one or more faults as an optical signal.

A fault information receiving method according to the present invention used for receiving optical signals in which signals at different bit rates coexist, includes (1) converting a received optical signal into an electric signal, (2) detecting a frequency of the electric signal, and (3) halting, when a fault information signal with one frequency set in advance in accordance with one or more faults is detected, output of the electric signal to the outside.

A fault information transmitting method according to the present invention used for transmitting optical signals in which signals at different bit rates coexist, includes (1) sending out, when one or more faults are detected in a signal for transmission, the fault information signal as an optical signal with the fault information sending method mentioned above, (2) transmitting the sent out optical signal, and (3) receiving the transmitted optical signal and detecting the fault information signal with the fault information receiving method mentioned above.

As described above, with the optical sending apparatus, the optical receiving apparatus, the optical transmission system, and the methods thereof according to the present invention, one frequency is allocated even to multiple kinds of fault information and supervising is performed by sending, transmitting, and receiving a signal at the frequency. Therefore, the optical sending apparatus is not required to send out multiple fault information signals at different frequencies at the same time, so multiple frequency generating units are not required. Also, the optical receiving apparatus is not required to detect, multiple fault information signals at different frequencies at the same time, so a filter for demultiplexing at respective frequencies and the like are not required and multiple frequency detecting units for detection at the respective frequencies are not required. Therefore, the optical sending apparatus, the optical receiving apparatus, the optical transmission system, and the methods thereof according to the present invention provide an effect that it becomes possible to supervise multiple kinds of fault information with a simple construction.

BRIEF DESCRIPTION OF THE DRAWINGS

The exemplary aspects, features and advantages of the present invention will become more apparent from the following detailed description when taken in conjunction with the accompanying drawings wherein:

FIG. 3 shows examples of frequencies corresponding to fault information;

FIG. 9 shows examples of signal bit rates under the standards of applications.

DETAILED DESCRIPTION OF THE EXEMPLARY ASPECTS

Figure 1:
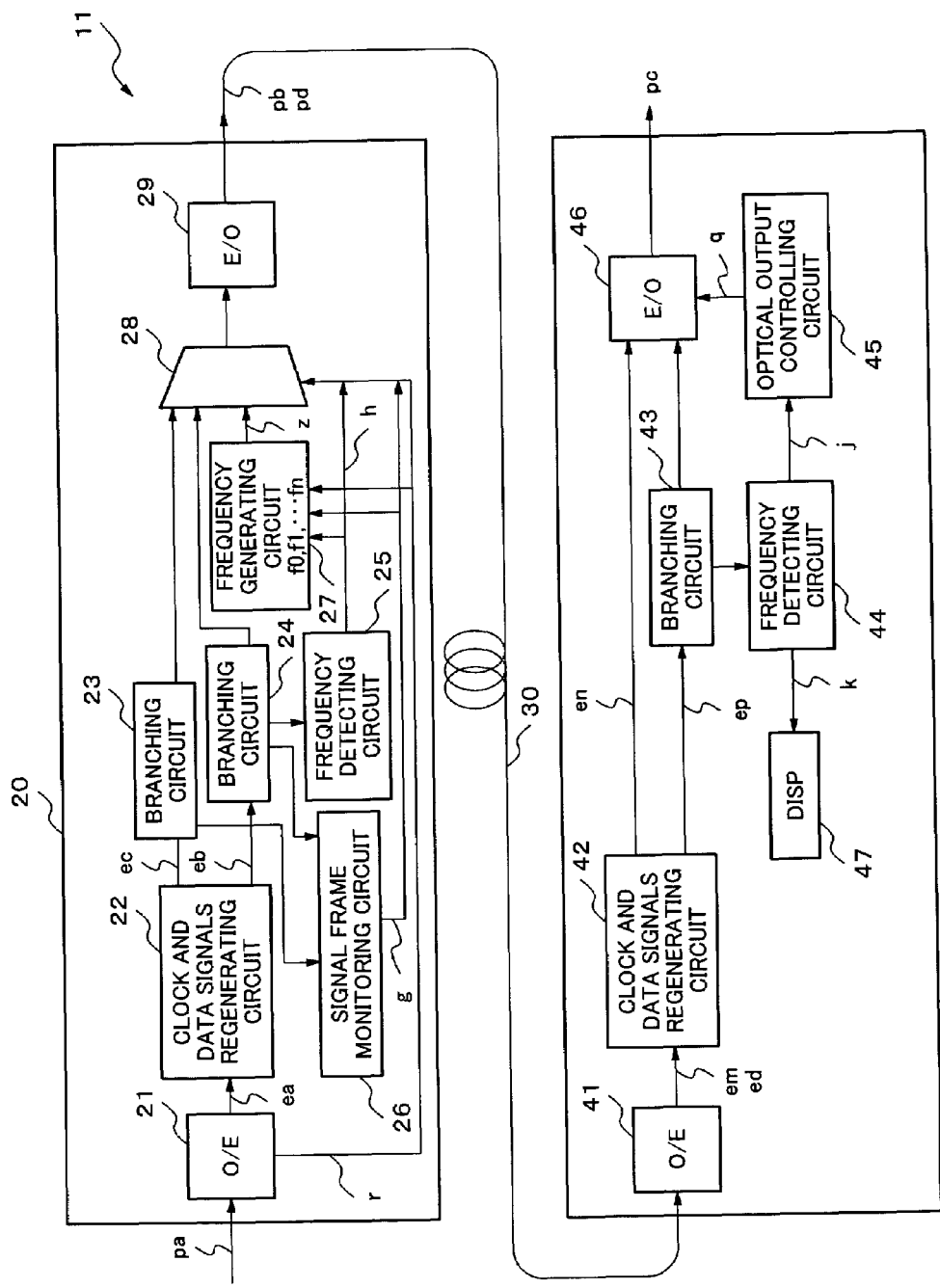
FIG. 1 is a block diagram showing a construction of an optical transmission system according to an exemplary embodiment of the present invention.

Exemplary aspects for carrying out the present invention will be described in detail below with reference to the drawing. The exemplary aspects described below show only illustrative examples in understanding the present invention, and the claims of the invention are not limited to these exemplary aspects.

Hereinafter, a construction of an optical transmission system according to an exemplary embodiment of the present invention will be described with reference to the accompanying drawings. FIG. 1 is a block diagram showing the construction of the optical transmission system according to the exemplary embodiment of the present invention.

An optical transmission system 11 includes an optical sending apparatus 20, an optical fiber 30, and an optical receiving apparatus 40.

The optical sending apparatus 20 includes an optic-electric conversion circuit (O/E) 21, a clock and data signals regenerating circuit 22, branching circuits 23 and 24, a frequency detecting circuit 25, a signal frame monitoring circuit 26, a frequency generating circuit 27, a switching circuit 28, and an electric-optic converting circuit (E/O) 29.

The optic-electric conversion circuit 21 converts a first optical signal pa generated by multiplexing a data signal and a clock signal and transmitted from an upstream apparatus (such as a transmitter) into an electric signal ea. In addition, the optic-electric conversion circuit 21 detects whether Loss of Signal (LOS) has occurred in the first optical signal pa due to a trouble of the upstream apparatus or the like. Then, when having detected the LOS, the optic-electric conversion circuit 21 outputs a fault detection signal r.

The clock and data signals regenerating circuit 22 regenerates a data signal ec and a clock signal eb from the electric signal ea. The branching circuit 23 branches the data signal ec into a signal for the signal frame monitoring circuit 26 and a signal for the switching circuit 28. The branching circuit 24 branches the clock signal eb into a signal for the frequency detecting circuit 25, a signal for the signal frame monitoring circuit 26, and a signal for the switching circuit 28.

The frequency detecting circuit 25 includes a frequency-voltage converting circuit (F/V converter) (not shown) and a voltage detecting circuit (not shown), for instance. The frequency detecting circuit 25 detects the frequency of the clock signal eb from the branching circuit 24 and judges whether the frequency has a value set in advance. Then, when the frequency does not have the value set in advance, the frequency detecting circuit 25 outputs a fault detection signal h. It should be noted here that it is sufficient that the frequency set in advance is set to be under the standards of the respective applications shown in FIG. 9.

The signal frame monitoring circuit 26 monitors the clock signal eb and the data signal ec and detects whether an out-of-synch state of frames (LOF: Loss of Frame) has occurred. When the LOF has been detected, the signal frame monitoring circuit 26 outputs a fault detection signal g.

The frequency generating circuit 27 generates a fault information electric signal z by switching the frequency of the fault information electric signal z in accordance with which fault detection signals have occurred. It is noted here that, there is a case where only one of the fault detection signals r, g, and h has occurred at a time and there is also a case where two or more of the fault detection signals r, g, and h have occurred at the same time. FIG. 3 shows examples of frequencies corresponding to fault information. As shown in the drawing, one frequency for fault information is allocated regardless of the number of faults occurred at the same time. In the manner described above, the frequency generating circuit 27 generates the fault information electric signal z having a certain frequency (one of f0 to fn (n is an integer)) in accordance with the contents of each occurred fault.

The switching circuit 28 passes the data signal ec from the branching circuit 23 and the clock signal eb from the branching circuit 24 when none of the fault detection signals r, g, and h described above have been outputted. On the other hand, when at least one of the fault detection signals r, g, and h has been outputted, the switching circuit 28 interrupts the passage of the data signal ec and passes the fault information electric signal z from the frequency generating circuit 27 and the clock signal eb from the branching circuit 24.

The electric-optic converting circuit (E/O) 29 multiplexes the electric signals passed by the switching circuit 28, converts the multiplexed electric signals into an optical signal, and sends out the optical signal to the optical fiber 30. More specifically, when having received the data signal ec and the clock signal eb, the electric-optic converting circuit 29 multiplexes the data signal ec and the clock signal eb and converts the multiplexed signals into a second optical signal pb. On the other hand, when having received the fault information electric signal z and the clock signal eb, the electric-optic converting circuit 29 multiplexes the fault information electric signal z and the clock signal eb and converts the multiplexed signals into a fault information optical signal pd. Then, the electric-optic converting circuit 29 sends out the optical signal obtained through the conversion to the optical fiber 30.

The optical receiving apparatus 40 includes an optic-electric conversion circuit (O/E) 41, a clock and data signals regenerating circuit 42, a branching circuit 43, a frequency detecting circuit 44, an optical output controlling circuit 45, an electric-optic converting circuit (E/O) 46, and a display portion (DISP) 47.

The optic-electric conversion circuit 41 converts the second optical signal pb into an electric signal em and converts the fault information optical signal pd into a fault information electric signal ed. The clock and data signals regenerating circuit 42 regenerates a data signal en and a clock signal ep from the electric signal em and regenerates the clock signal ep from the fault information electric signal ed. The branching circuit 43 branches the clock signal ep into a signal for the frequency detecting circuit 44 and a signal for the electric-optic converting circuit 46.

The frequency detecting circuit 44 includes a frequency-voltage converting circuit (not shown) and a voltage detecting circuit (not shown), for instance. The frequency detecting circuit 44 detects the frequency of the clock signal ep from the branching circuit 43 and judges whether the detected frequency is the frequency of the fault information electric signal z. Then, when the detected frequency is the frequency of the fault information electric signal z, the frequency detecting circuit 44 outputs a fault detection signal j. Also, the frequency detecting circuit 44 generates a fault evaluation signal k expressing the kind of each fault based on the frequency of the detected clock signal ep.

When the fault detection signal j has been outputted from the frequency detecting circuit 44, the optical output controlling circuit 45 outputs a halt signal q in order to halt sending out of the fault information optical signal pd to a downstream apparatus (such as a receiver). On receiving the halt signal q from the optical output controlling circuit 45, the electric-optic converting circuit 46 halts sending out of a third optical signal pc. The display portion 47 is constructed using a liquid crystal display apparatus or the like and displays the kind of the fault based on the fault evaluation signal k from the frequency detecting circuit 44.

As the optical fiber 30, it is possible to use a single-mode fiber (SMF), a dispersion shifted optical fiber (DSF), or the like.

Figure 2:
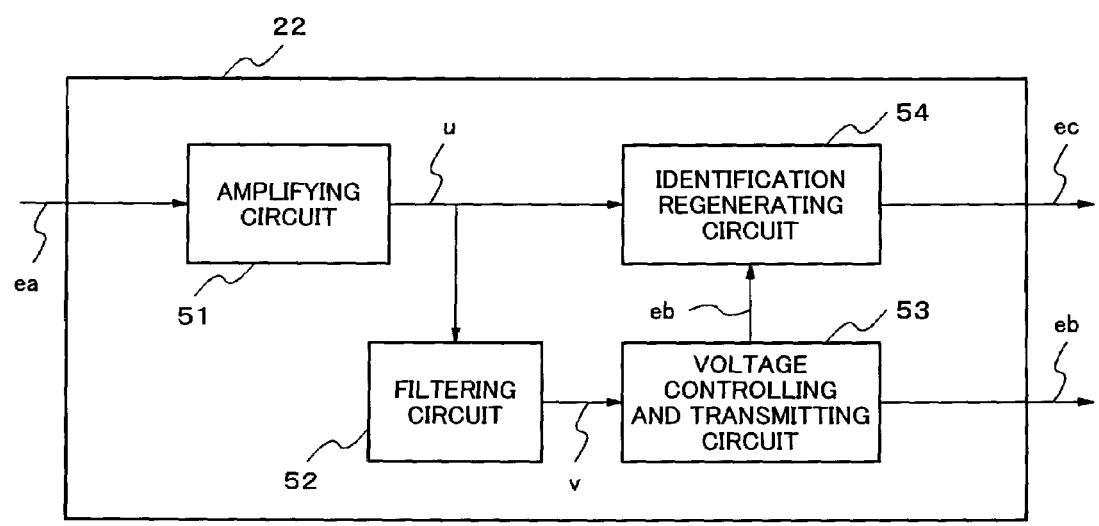
FIG. 2 is a block diagram showing a construction of a clock and data signals regenerating circuit in FIG. 1.

FIG. 2 is a block diagram showing a construction of the clock and data signals regenerating circuit 22 in FIG. 1.

The clock and data signals regenerating circuit 22 includes an amplifying circuit 51, a filtering circuit 52, a voltage controlling and transmitting circuit 53, and an identification regenerating circuit 54. The amplifying circuit 51 amplifies the electric signal ea from the optic-electric conversion circuit 21 and outputs the amplified electric signal ea as an electric signal u. The electric signal u is branched by a branching circuit or simply branched by a signal wire or the like into a signal for the filtering circuit 52 and a signal for the identification regenerating circuit 54. The filtering circuit 52 smoothes the electric signal u and outputs a voltage for control v. The voltage controlling and transmitting circuit 53 outputs a clock signal eb corresponding to the voltage for control v. The identification regenerating circuit 54 receives the electric signal u from the amplifying circuit 51 and extracts a data signal ec based on the clock signal eb.

Figure 4:
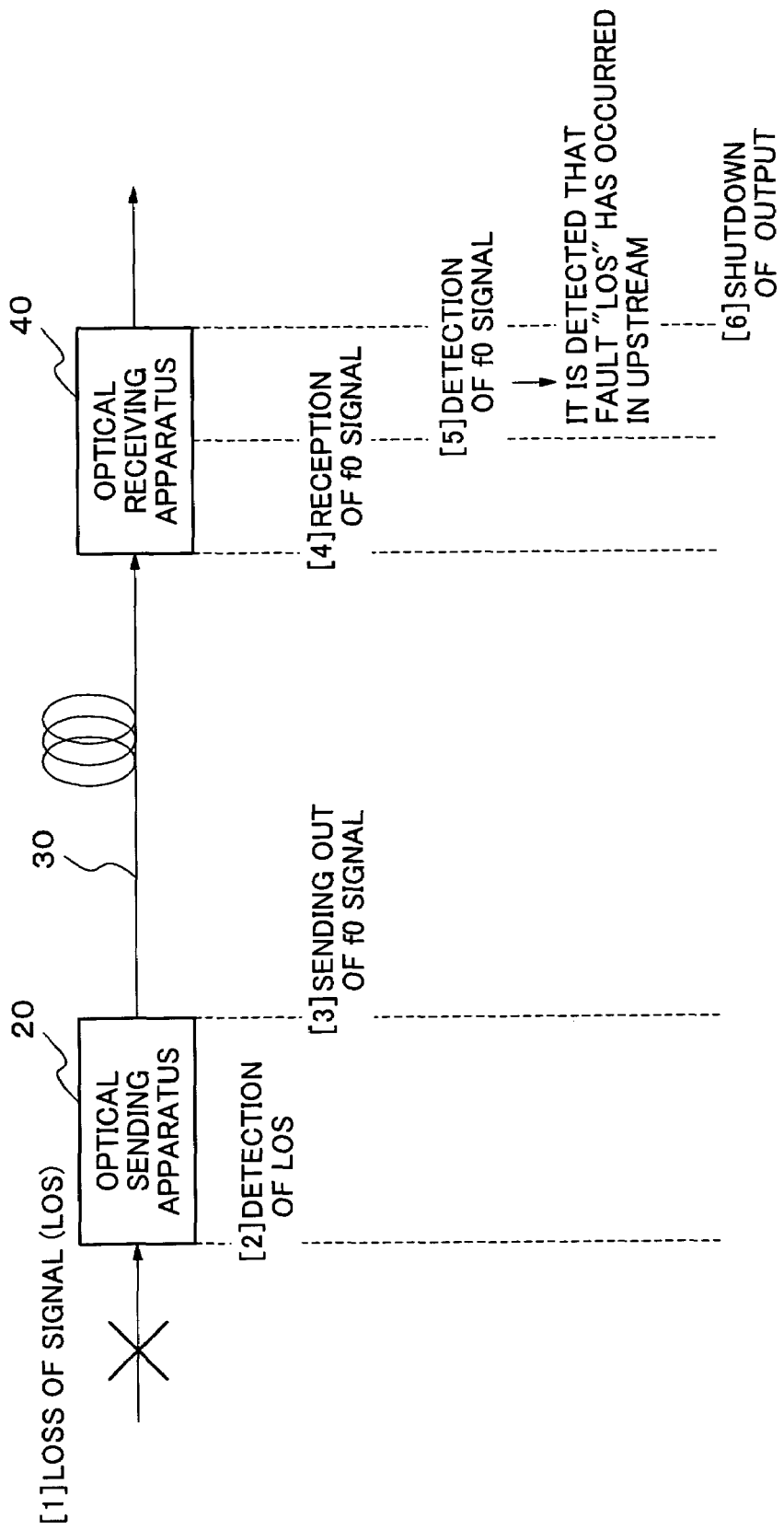
FIG. 4 is a sequence diagram for explanation of an example of an operation of the optical transmission system in FIG. 1.
Figure 5:
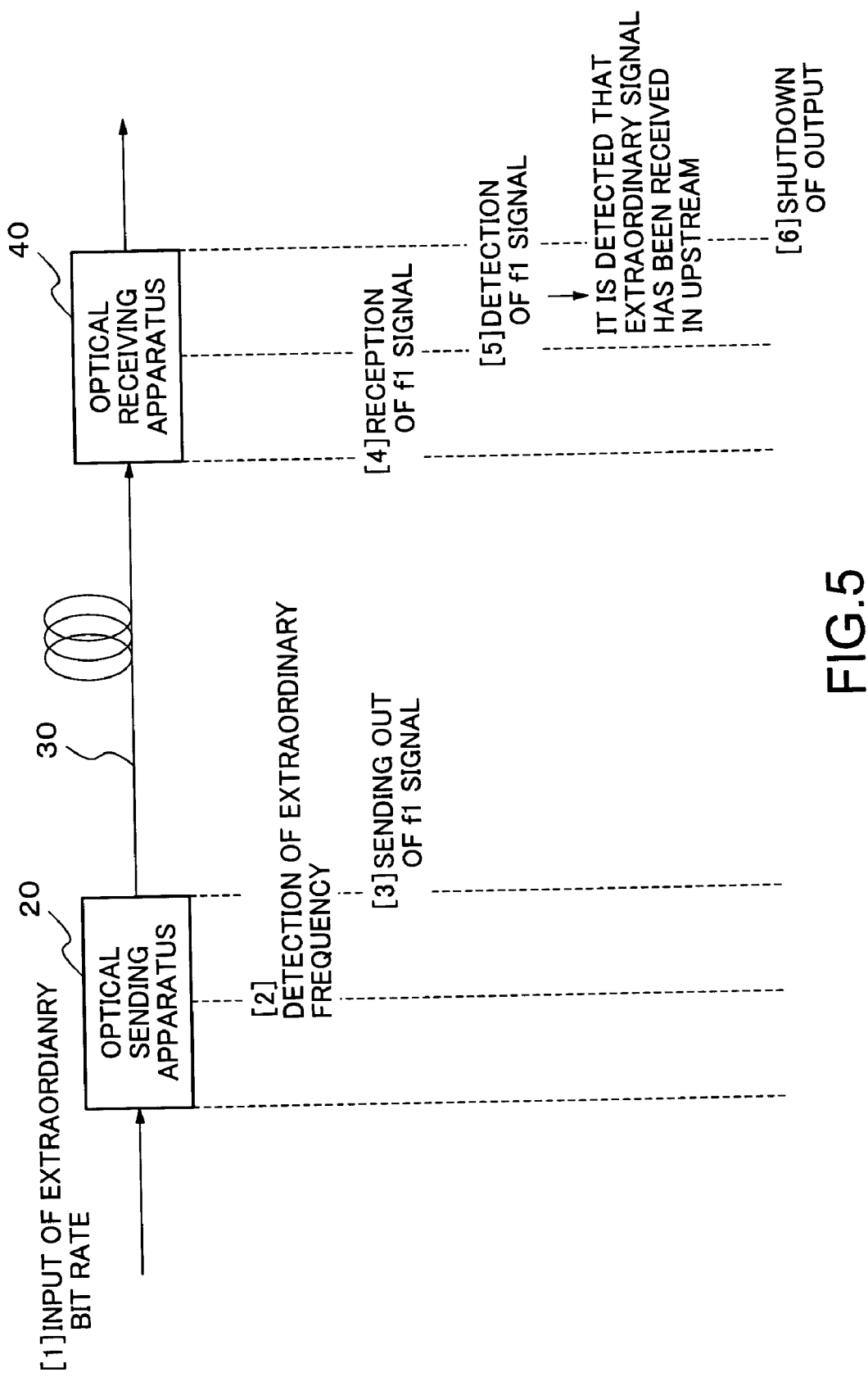
FIG. 5 is a sequence diagram for explanation of an example of another operation of the optical transmission system in FIG. 1.
Figure 6:
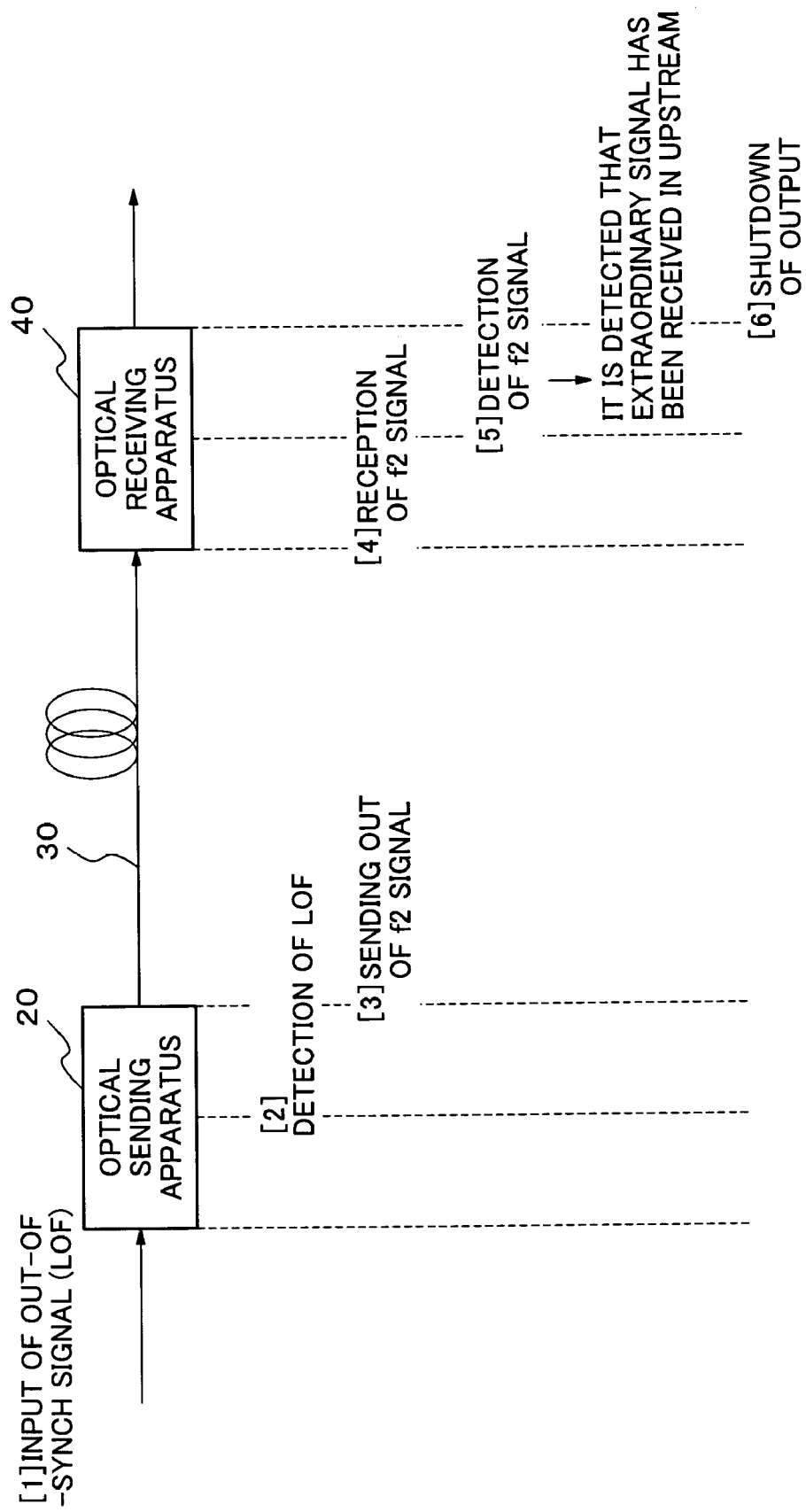
FIG. 6 is a sequence diagram for explanation of an example of still another operation of the optical transmission system in FIG. 1.
Figure 7:
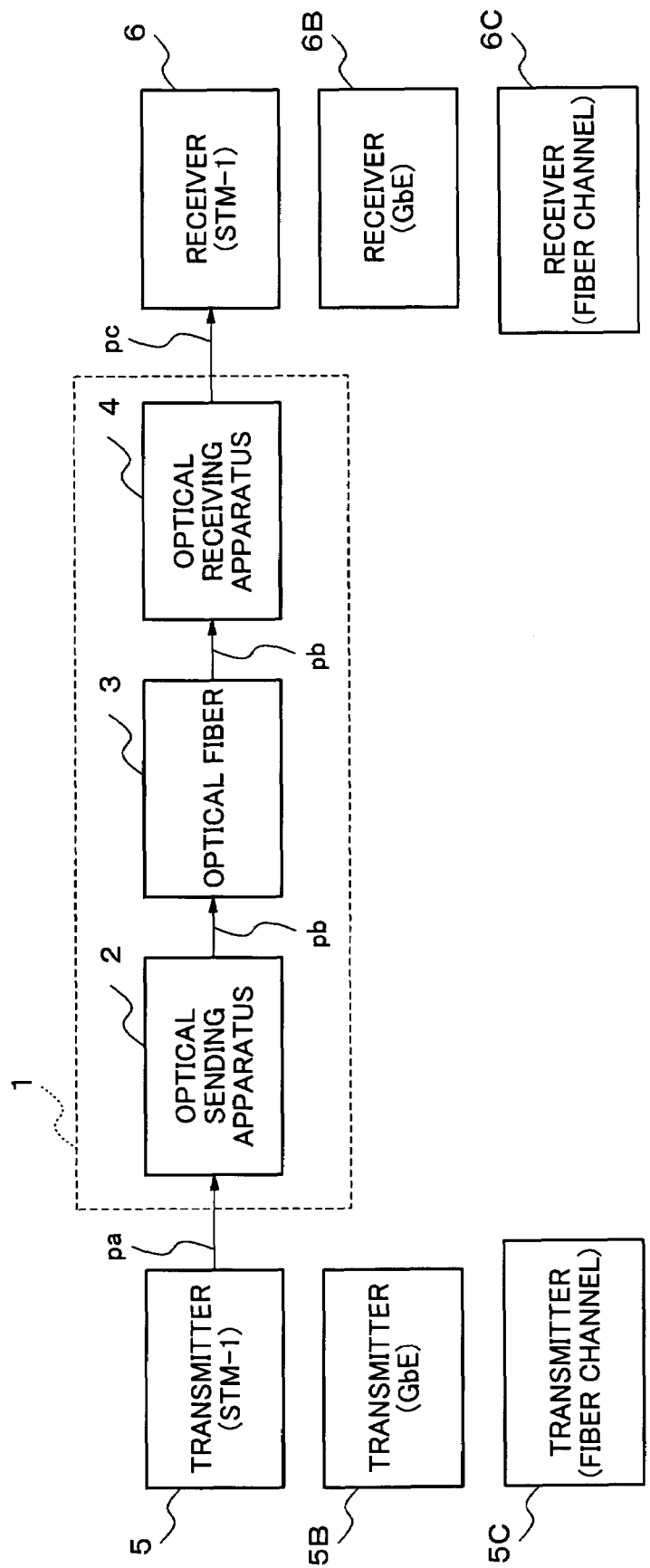
FIG. 7 is a block diagram showing a construction of an optical transmission system relating to the present invention.
Figure 8:
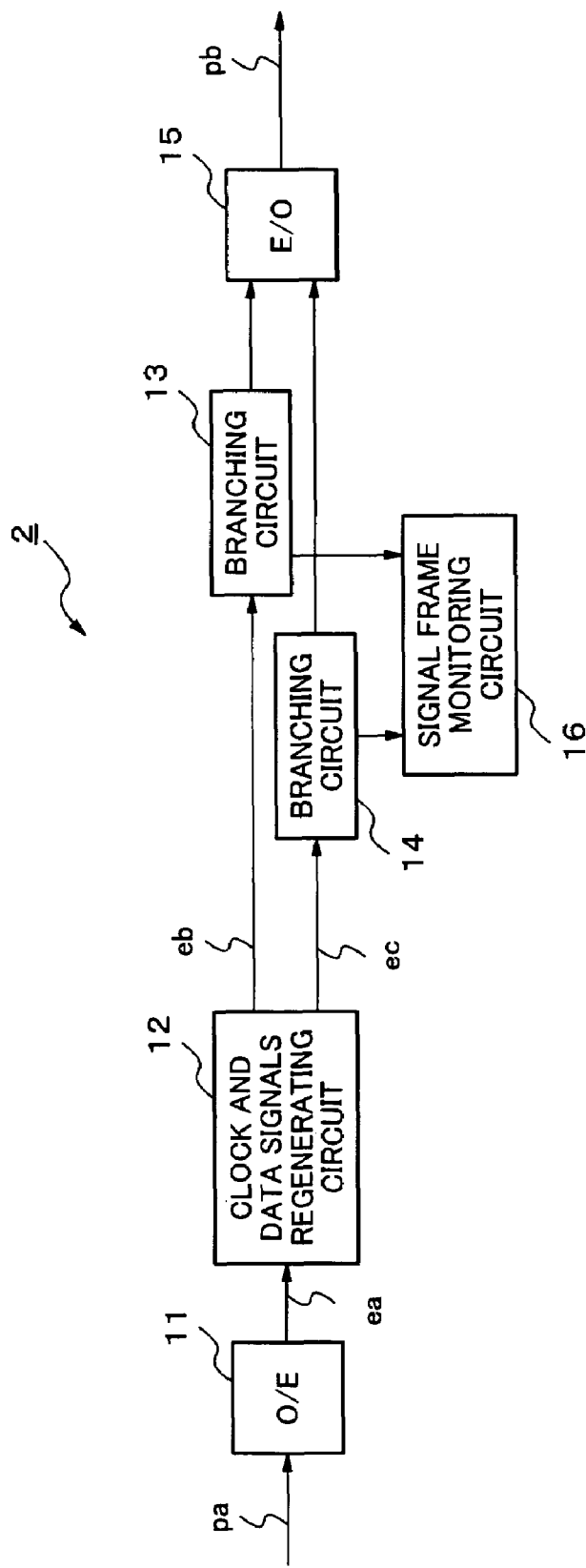
FIG. 8 is a block diagram showing a construction of an optical sending apparatus in FIG. 7.

FIGS. 4 to 6 are each a sequence diagram for explanation of an example of an operation of the optical transmission system 11 in FIG. 1. The processing contents of a fault information transmitting method used in the optical transmission system 11 will be described with reference to the drawings.

In the optical transmission system 11; when it has been detected that at least one fault has occurred in the first optical signal pa transmitted from the upstream apparatus, the optical sending apparatus 20 halts sending out of the first optical signal pa. In addition, the optical sending apparatus 20 generates a fault information optical signal pd modulated into a frequency corresponding to the kind of the at least one fault and sends out the fault information optical signal pd to the optical fiber 30. In particular, in this embodiment, the optical sending apparatus 20 generates a fault information optical signal pd having one frequency regardless of the number of the kinds of faults occurred at the same time (fault information sending processing). Meanwhile, when having received the fault information optical signal pd through the optical fiber 30, the optical receiving apparatus 40 detects the kind of the at least one fault occurred in the first optical signal pa and halts sending out the fault information optical signal pd to the downstream apparatus (fault information receiving processing).

As a concrete example, FIG. 4 shows an example where LOS has occurred in the first optical signal pa.

First, in Phase [1], due to lowering of output of a signal from the upstream transmission apparatus or the like, input of the first optical signal pa into the optical sending apparatus 20 is halted. In Phase [2], LOS is detected at the optic-electric conversion circuit 21 of the optical sending apparatus 20 and the fault detection signal r is outputted. In Phase [3], the fault information optical signal pd with the frequency f0 from the electric-optic converting circuit 29 of the optical sending apparatus 20 is sent out to the optical fiber 30. In Phase [4], the fault information optical signal pd with the frequency f0 is received at the optical receiving apparatus 40. In Phase [5], the frequency f0 of the clock signal ep. is detected at the frequency detecting circuit 44. As a result, it is recognized that LOS has been detected at the optical sending apparatus 20.

Finally, in Phase [6], output to the downstream apparatus is halted.

In a like manner, FIG. 5 shows an example where an extraordinary frequency has occurred in the first optical signal pa.

First, in Phase [1], the first optical signal pa, in which an extraordinary bit rate has occurred, is inputted into the optic-electric conversion circuit 21 of the optical sending apparatus 20. In Phase [2], the extraordinary frequency of the clock signal eb is detected at the frequency detecting circuit 25 of the optical sending apparatus 20 and the fault detection signal h is outputted. In Phase [3], the fault information optical signal pd with the frequency f1 is sent out from the electric-optic converting circuit 29 of the optical sending apparatus 20 to the optical fiber 30. In Phase [4], the fault information optical signal pd with the frequency f1 is received at the optical receiving apparatus 40. In Phase [5], the frequency f1 of the clock signal ep is detected at the frequency detecting circuit 44. As a result, it is recognized that a signal at an extraordinary bit rate has been detected at the optical sending apparatus 20. Here, in this case, it is indirectly detected that the bit rate is extraordinary through detection of the extraordinary frequency at the frequency detecting circuit 25 of the optical sending apparatus 20. Finally, in Phase [6], output to the downstream apparatus is halted.

In a like manner, FIG. 6 shows an example where LOF has occurred in the first optical signal pa.

First, in Phase [1], the first optical signal pa, in which the LOF has occurred, is inputted into the optic-electric conversion circuit 21 of the optical sending apparatus 20. In Phase [2], the LOF is detected at the signal frame monitoring circuit 26 of the optical sending apparatus 20 and the fault detection signal g is outputted. In Phase [3], the fault information optical signal pd with the frequency f2 is sent out from the electric-optic converting circuit 29 of the optical sending apparatus 20 to the optical fiber 30. In Phase [4], the fault information optical signal pd with the frequency f2 is received at the optical receiving apparatus 40. In Phase [5], the frequency f2 of the clock signal ep is detected at the frequency detecting circuit 44. As a result, it is recognized that the LOF has been detected at the optical sending apparatus 20. Finally, in Phase [6], output to the downstream apparatus is halted.

Also, for instance, when a signal at an extraordinary bit rate and LOF have occurred at the same time by the optical sending apparatus 20, the fault detection signals h and g are outputted at the same time. Then, the fault information optical signal pd with a frequency f3 is sent out from the electric-optic converting circuit 29 to the optical fiber 30. At the frequency detecting circuit 44 of the optical receiving apparatus 40, the frequency f3 is detected. As a result, it is recognized that the signal at the extraordinary bit rate and the LOF have been detected at the same time by the optical sending apparatus 20 and output to the downstream apparatus is halted.

In the manner described above, one kind of frequency is allocated regardless of the number of faults occurred at the same time and the signal with multiple kinds of fault information are transmitted from the optical sending apparatus 20 to the optical receiving apparatus 40 using the one allocated frequency. In this case, by the frequency detecting circuit 44, the fault evaluation signal k is generated based on the frequency of the clock signal ep. Then, fault contents are identified through displaying of the kind of each fault at the display portion 47 based on the fault evaluation signal k.

As described above, in the embodiment, transmission of signals at all bit rates is supported. In addition, one frequency is allocated even to multiple kinds of fault information and a signal at the frequency is sent, transmitted, received, and supervised. Therefore, it is not required for the optical sending apparatus to transmit multiple fault information electric signals with different frequencies at the same time, so a plurality of frequency generating circuits is not required. Also, the optical receiving apparatus is not required to detect multiple fault information electric signals with different frequencies at the same time, so a filter for splitting at respective frequencies or the like is not required and a plurality of frequency detecting units for detection at the respective frequencies is not required.

As a result, the optical sending apparatus, the optical receiving apparatus, the optical transmission system, and the methods thereof according to the present invention provide an effect that it becomes possible to supervise multiple kinds of fault information with a simple construction.

The embodiment of the present invention has been described in detail above with reference to the drawings. However, the concrete construction is not limited to only the embodiment and design changes and the like in a range that does not depart from the gist of the present invention may be made.

For instance, the optical fiber 30 may be provided with an optical amplifying repeater for amplifying the second optical signal pb and the fault information optical signal pd midway therethrough in accordance with the length thereof. Also, the optical sending apparatus 20 and the optical receiving apparatus 40 may be provided with an optical amplifier inside or outside thereof as necessary. Further, when the fault information optical signal pd has been received at the optical receiving apparatus 40, an alarm sound may be emitted.

Also, in this embodiment, the LOS, the extraordinary frequency, and the LOF have been detected. However, a circuit for detecting a code violation (CV) extraordinariness of a Gigabit Ethernet (GbE (registered trademark)) signal and outputting a new fault detection signal may be added as necessary, for instance. Still further, transmission may be performed also for other faults by allocating new fault information optical signal frequencies.

It should be noted here that the present invention is applicable also to an optical repeater and an optical relaying apparatus for transmitting an optical signal transmitted from an upstream apparatus to a downstream apparatus.

While the present invention has been described in connection with certain exemplary embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

Further, the inventor's intent is to retain all equivalents of the claimed invention even if the claims are amended later during prosecution.

What is claimed is:

1. An optical sending apparatus for sending out optical signals in which signals at different bit rates coexist, comprising:

a frequency generating unit for, when one or more faults occurring in a signal for transmission are detected, generating a fault information signal with one frequency set in advance in accordance with the one or more faults;

a switching unit for passing the fault information signal instead of the signal for transmission;

an electric-optic converting unit for converting the passed fault information signal into an optical signal;

an optic-electric conversion unit for converting an inputted optical signal into an electric signal, detection signal disappearance, and outputting a first fault detection signal;

a clock and data signals regenerating unit for regenerating a data signal and a clock signal from the electric signal;

a signal frame unit for monitoring a frame out-of-synch state of the data signal and outputting a second fault detection signal; and a frequency detecting unit for detecting an extraordinary frequency of the clock signal and outputting a third fault detection signal, wherein:

the frequency generating unit generates a fault information signal by switching a frequency of the fault information signal in accordance with the first fault detection signal, the second fault detection signal, and the third fault detection signal respectively, which has been outputted;

the switching unit passes the fault information signal and the clock signal when output of at least one of the first fault detection signal, the second fault detection signal, and the third fault detection signal has been confirmed, on the other hand, passes the data signal and the clock signal when output of the first fault detection signal, the second fault detection signal, and the third fault detection signal has not been confirmed; and the electric-optic converting unit multiplexes the signals passed by the switching unit and converts the multiplexed signals into an optical signal again.

2. An optical sending apparatus according to claim 1, wherein when output of two or more of the first fault detection signal, the second fault detection signal, and the third fault detection signal at the same time is confirmed, the frequency generating unit generates the fault information signal with one frequency set in advance.

* * * * *